US010175884B2

(12) United States Patent
Aurongzeb et al.

(10) Patent No.: US 10,175,884 B2
(45) Date of Patent: Jan. 8, 2019

(54) SYSTEM AND METHOD OF MANAGEMENT FOR A PERIPHERAL INTERACTION DEVICE FOR A GRAPHICAL USER INTERFACE TOUCH SYSTEM

(71) Applicant: Dell Products, LP, Round Rock, TX (US)

(72) Inventors: Deeder M. Aurongzeb, Austin, TX (US); Lawrence A. Stone, Austin, TX (US); Yagiz Can Yildiz, Austin, TX (US); Joseph Daniel Mallory, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 149 days.

(21) Appl. No.: 15/233,764

(22) Filed: Aug. 10, 2016

(65) Prior Publication Data

US 2018/0046318 A1 Feb. 15, 2018

(51) Int. Cl.
*G06F 3/0488* (2013.01)
*G06F 3/041* (2006.01)
*G06F 3/044* (2006.01)

(52) U.S. Cl.
CPC ........ *G06F 3/04886* (2013.01); *G06F 3/0416* (2013.01); *G06F 3/044* (2013.01)

(58) Field of Classification Search
CPC .............. G06F 3/0354; G06F 3/03543; G06F 3/03541; G06F 3/041; G06F 3/0418; G06F 3/04886

See application file for complete search history.

(56) References Cited

U.S. PATENT DOCUMENTS

| | | | |
|---|---|---|---|
| 8,169,421 B2 | 5/2012 | Wright | |
| 8,692,795 B1 | 4/2014 | Kremin | |
| 9,158,390 B2* | 10/2015 | Petersen | ................. G06F 3/033 |
| 9,170,658 B2* | 10/2015 | Quek | ..................... G06F 3/033 |
| 2011/0001706 A1 | 1/2011 | Sanford | |
| 2011/0199325 A1* | 8/2011 | Payne | ................... G06F 3/0338 345/173 |
| 2013/0038549 A1* | 2/2013 | Kitada | .................. G06F 3/0338 345/173 |
| 2013/0120258 A1 | 5/2013 | Maus | |
| 2013/0169582 A1 | 7/2013 | Ryshtun | |
| 2014/0079475 A1* | 3/2014 | O'Neill | .................. B23Q 3/103 403/299 |
| 2014/0160063 A1 | 6/2014 | Yairi | |

(Continued)

*Primary Examiner* — Kenneth Bukowski
(74) *Attorney, Agent, or Firm* — Prol Intellectual Property Law, PLLC; H. Kenneth Prol (57) ABSTRACT

An information handling system for interacting with a peripheral interaction device having a plurality of conductive pads comprising a display screen having a touch screen including a touch sensor device that detects contact by a polymer conductor interface device assembly having a plurality of conductive pads, a processor executing instructions for a peripheral interaction device degradation management system that determines whether there is degradation in the touch signal response of at least one conductive pad of the polymer conductor interface device assembly below a degradation threshold signal level; and the processor adjusting drive signal voltages if a touch signal response falls below the degradation threshold signal level.

18 Claims, 6 Drawing Sheets

(56) References Cited

U.S. PATENT DOCUMENTS

| | | | |
|---|---|---|---|
| 2014/0253446 A1* | 9/2014 | Petersen | G06F 3/0338 345/161 |
| 2015/0169080 A1* | 6/2015 | Choi | G06F 3/0488 345/174 |
| 2015/0268812 A1 | 9/2015 | Walline | |

* cited by examiner

SYSTEM AND METHOD OF MANAGEMENT FOR A PERIPHERAL INTERACTION DEVICE FOR A GRAPHICAL USER INTERFACE TOUCH SYSTEM

FIELD OF THE DISCLOSURE

The present disclosure generally relates to information handling systems, and more particularly a system and method of a management for a peripheral interaction device used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. A variety interface system may be used to interact with an information handling system including alpha-numeric keyboards, cursor control devices of a variety of types, touch screen system, camera systems, gesture detection systems, proximity sensors and the like.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
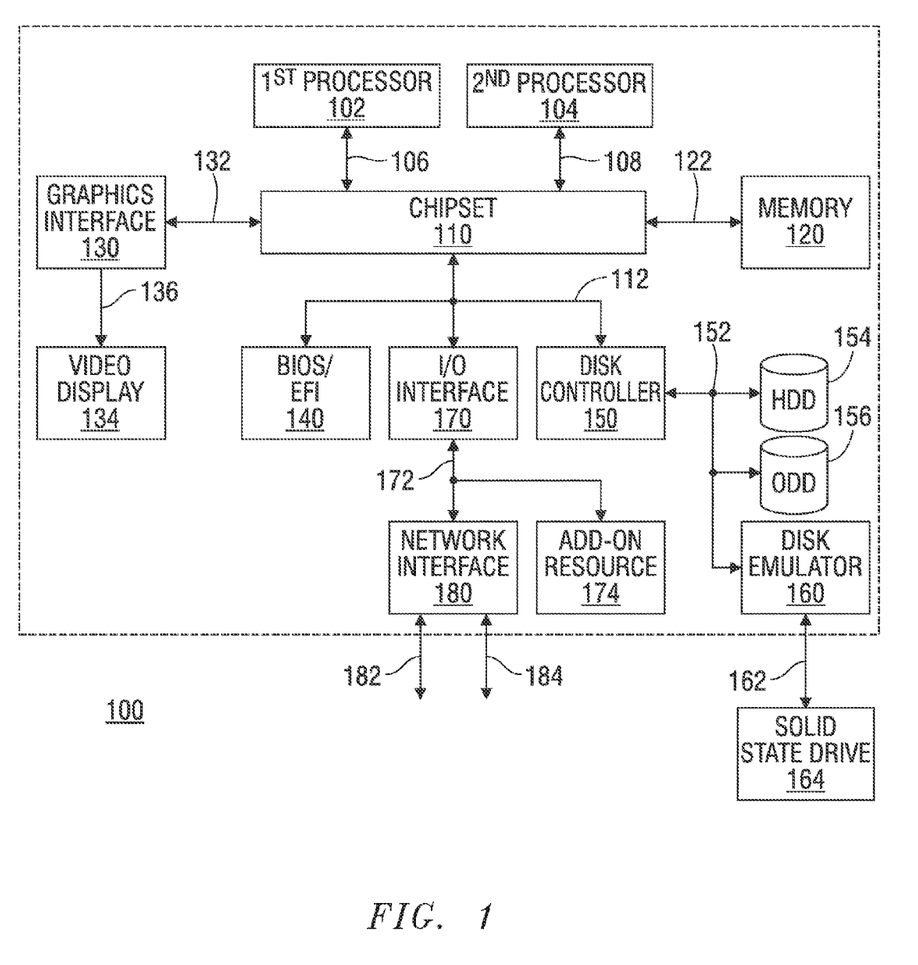
FIG. 1 is a block diagram illustrating an information handling system according to an embodiment of the present disclosure.

FIG. 1 illustrates a generalized embodiment of information handling system 100. FIG. 1 is a block diagram illustrating an information handling system according to an embodiment of the present disclosure. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Those processing resources may be used, in an example embodiment, for machine execution of instructions of a peripheral interaction device degradation management system in accordance with one or more embodiments described herein. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. Further, in an aspect, graphics interface 130 may include a touch screen driver, including a controller and some portion or software, firmware, or hardware for control of voltage signals and capacitance detection from touch sensors such as for a capacitive touch screen device operatively connected to an array of capacitive touch sensors embedded with a digital display device. In an example embodiment a touch screen controller may include the NXP® MPR 121 Proximity Capacitive Touch Sensor Controller or similar such controllers. A touch screen sensor device may be embedded in a digital display screen device connected via graphics interface 130 in some embodiments to receive capacitive touch responses from peripheral interface devices such as those described in the present disclosure. Further, a touch screen system including drivers, controllers, sensor devices and the like may include jitter and false touch filtering capabilities to determine a touch or proximity of a peripheral interface device. This filtering, or other error correction, may be conducted to condition the capacitive touch responses to eliminate hysteresis in the capacitive touch data of one or more points of touch to the touch screen sensor in establishing baseline capacitive signal responses as described further below. Capacitive touch screen controllers may implement addition capacitive signal conditioning such as thresholds and delays to help ensure veracity of the capacitive touch signal response in some embodiments. It is understood that additional touch screen technologies may be employed instead of capacitive touch screens and such technologies may be implemented in place of capacitive touch screen in the embodiments of the present disclosure. For purpose of the present disclosure however, capacitive touch screen system are discussed in detail.

In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources. This may include resources relating to touch screen systems such as those described herein.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, LTE macrocellular, or a combination thereof. Network channels 182 and 184 can be connected to external network resources (not illustrated). The network resource can include another information handling system, a data storage system, another network, a grid management system, another suitable resource, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, tablet computer, a mobile computing device, a consumer electronic device, a network server or storage device, a switch router, wireless router, or other network communication device, a network connected device (cellular telephone, tablet device, etc.), or any other suitable device, and can vary in size, shape, performance, price, and functionality. In at least one example embodiment, an information handling system may include a smart desk information handling system used as a computing desk or tabletop surface. Any of the information handling systems may be interacted with using a peripheral interaction device such as via a touch screen system. In an example embodiment, the peripheral interaction device may be a stylus, pen, a finger, hand, or wearable device used for interaction with a touch screen system such as a capacitive touch screen device. In a further example embodiment, the peripheral interaction device may be a polymer conductor interface device assembly such as described further in embodiments herein.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as an Intel® Core™, ARM, or other brand processor, or other such device, or software capable of operating a relevant environment of the information handling system. The device or module can also include a combination of the foregoing examples of hardware or software. In an example embodiment a device or module may include the peripheral interaction device degradation management system described in embodiments herein. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Figure 2:
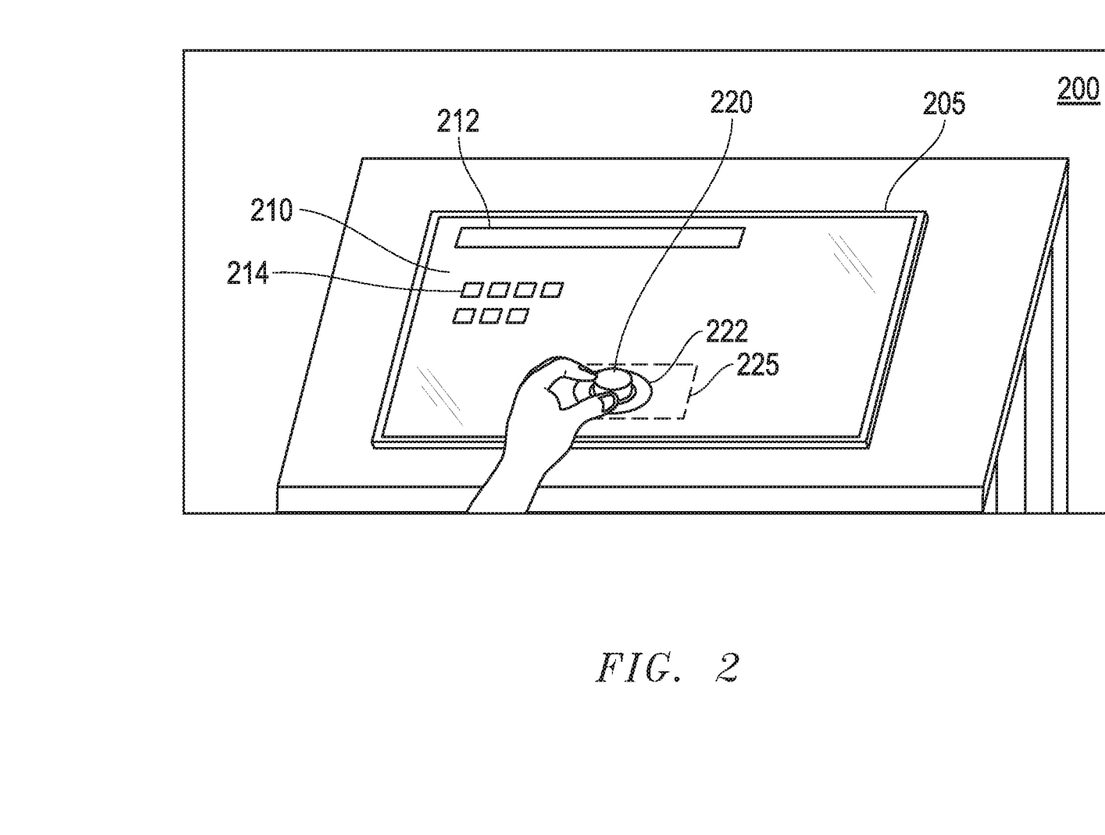
FIG. 2 is a graphical schematic diagram illustrating a smart desktop information handling system and a polymer conductor interface device assembly according to an embodiment of the present disclosure.

FIG. 2 is a graphical diagram 200 illustrating use of a polymer conductor interface device assembly having a plurality of conduction pads with an information handling system. In a particular example embodiment, the information handling system may be a smart desktop information handling system such as 205. In the example embodiment, a smart desktop information handling system 205 may be an information handling system with a display screen, including a touch screen system, integrated into or sitting on a desk top in an example embodiment. FIG. 2 illustrates a smart desktop information handling system 205 having a graphical user interface (GUI) 210 including icons 214 and command menus 212 or other graphical interface elements for interacting with a touch screen GUI.

FIG. 2 further illustrates another type of GUI element that is a virtual interface tool 222 for use with a polymer conductor interface device assembly having a plurality of conduction pads 220. In a particular aspect, virtual interface tool 222 is a virtual knob. The polymer conductor interface device assembly having a plurality of conduction pads 220 may be placed over the GUI element virtual knob 222 in one aspect and the plurality of conduction pads may interface with the touch screen to virtually turn the virtual knob. In other aspects, virtual interface tool 222 may be a virtual slide tool, a virtual button, soft key or some other virtual interface element for use with a polymer conductor interface device assembly having a plurality of conduction pads. FIG. 2 further illustrates a polymer conductor interface device assembly interaction zone 225 on the touch screen device. A polymer conductor interface device assembly interaction zone 225 is an area where the touch screen system may detect that a plurality of conduction pads of a polymer conductor interface device assembly has contacted the touch screen display device.

Figure 3A:
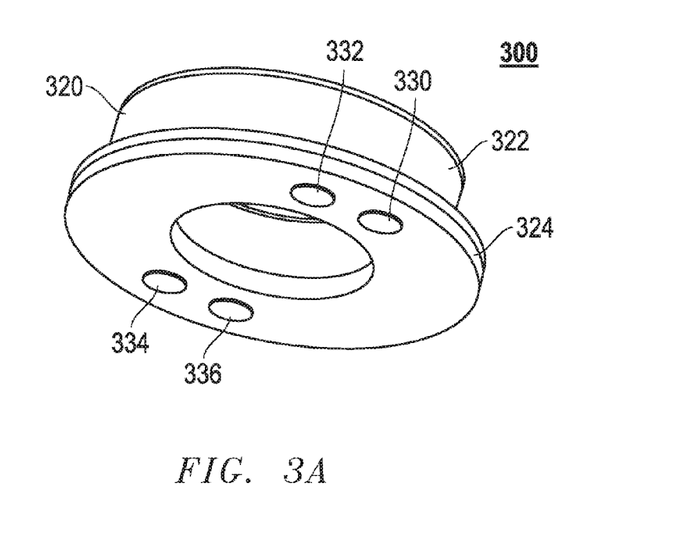
FIG. 3A is a graphical schematic diagram illustrating a polymer conductor interface device assembly according to an embodiment of the present disclosure.

FIG. 3A is a graphical diagram 300 of a polymer conductor interface device assembly 320 having a plurality of conduction pads 330, 332, 334, and 336. The polymer conductor interface device assembly may be of a variety of shapes and made of a variety of materials. In one aspect, polymer conductor interface device assembly 320 may be a ring, a puck, a bar, a triangular shape and may be of a solid shape or have one or more openings or other topological features to improve ergonomics while handling the polymer conductor interface device assembly 320.

The embodiment shown in FIG. 3A is a ring shape, but it is understood that any ergonomic shape may be used. In another aspect, the body 322 of the polymer conductor interface device assembly is made of a conductive material. The body 322 of polymer conductor interface device assembly 320 is made of a conductive material to assist with operation during interfacing with a capacitive touch screen device. Field of a user's hand will transmit through the conductive material when touched.

In a further aspect, the body 322 of the polymer conductor interface device assembly 320 is made of aluminum entirely or in part such that conduction to the conductive pads 330, 332, 334, and 336 occurs. Other conductive material may be used in place or in addition to aluminum as understood by those of skill. For example, conductive polymers or polymers with conductive coating layers may be used in some embodiments. Other conductive metals or other structural materials coated with conductive metals or conductive polymers may be used for the body 322 in other embodiments.

The polymer conductor interface device assembly 320 may also have a plurality of conductive pads such as those shown at 330, 332, 334, and 336. Conductive pads 330, 332, 334, and 336 may be made of a compressible material that permits smooth interface and an easy glide along a surface of an information handling system display with touch screen interface. A material such as a polymer foam or a polymer mesh having a low coefficient of friction may be used to form the conductive pads 330, 332, 334, and 336 in some example embodiments. In an aspect, conductive pads 330, 332, 334, and 336 will protrude from the bottom 324 of the polymer conductor interface device assembly 320 to establish points of contact. In an embodiment, the bottom 324 of polymer conductor interface device assembly 320 may be made of a non-conductive material such as a polymer like Plexiglas or epoxy to isolate the conductive points interfacing with the capacitive touch screen to the conductive pads 330, 332, 334, and 336. In such an example embodiment, the conductive pads 330, 332, 334, and 336 may then interface at a plurality of points to operate various virtual interface tool on the GUI. In yet another embodiment, the conductive pads 330, 332, 334, and 336 may be made of a foam or mesh with a low coefficient of friction material, however a conductive coating may be applied in some embodiments to enhance or provide conductivity to an acceptable level of operation with a capacitive touch screen device. Further a coating may be used, such as Mylar, to provide a low coefficient of friction. This conductive coating may be of a variety of materials. A chart of example materials is shown in Table 1.

TABLE 1

| Type | Dielectric Constant | Dielectric Breakdown (V/μ) | Electric Density (J/cm$^3$) |
|---|---|---|---|
| Epoxy + 10 wt % nanotitania | 13.8 | 391 | 9.34 |
| Polyimide + 80 vol % BT | 70 | 168 | 8.74 |
| Polyvinylidine Flouride HexaFlouroPropylene + 50 vol % Phosphonic Acid modified Barium Titanate | 37 | 210 | 6.10 |
| Ether bisphenol epoxy resin | 10 | 332 | 4.88 |
| Polycarbonate + 50 vol % Phosphonic Acid modified Barium Titanate | 20 | 210 | 3.90 |
| Polyimide + 60 vol % BT | 30 | 168 | 3.75 |
| Polystyrene + 60 vol % nano BT | 45 | 120 | 2.87 |
| PVTF-TrFE-CTFE + 20 vol % Barium Titanate | 48 | 114.82 | 2.80 |
| Polyimide + 40 vol % BT | 20 | 168 | 2.50 |

Figure 3B:
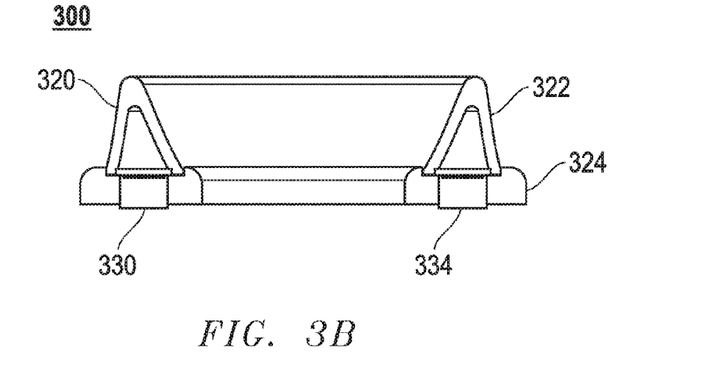
FIG. 3B is a graphical schematic diagram illustrating another view of a polymer conductor interface device assembly according to an embodiment of the present disclosure.

FIG. 3B is a graphical diagram 300 showing a cross-section of a polymer conductor interface device assembly 320 having a plurality of conduction pads 330 and 334. As described, the polymer conductor interface device assembly may be of a variety of shapes and made of a variety of materials. In one aspect, polymer conductor interface device assembly 320 may be a ring as shown or another ergonomic shape. The body 322 of polymer conductor interface device assembly 320 is made of a conductive material to assist with operation during interfacing with a capacitive touch screen device. Field of a user's hand touching the body 322 during operation will transmit through the conductive material when touched. In some embodiments, the body 322 of the polymer conductor interface device assembly 320 is tall enough to limit inadvertent touches by a user's hand on the touch screen device. In an example embodiment, the ring body 322 or other ergonomic form may be at least raised 3-5 inches from the capacitive touch screen. It is understood a higher form factor is also contemplated.

Conductive pads 330 and 334 are operatively connected to enable conduction from the body 322 of the polymer conductor interface device assembly 320 through the conductive coating described above. The conductive pads 330 and 334 may be made of a compressible material that permits smooth interface and an easy glide along a surface of an information handling system display with touch screen interface, including materials such as a polymer foam or a polymer mesh. In the shown embodiment of FIG. 3B, the conductive pads 330 and 334 are shown to protrude from the bottom 324 of the polymer conductor interface device assembly 320 to establish points of contact at the conductive pads. In an embodiment, the bottom 324 of polymer conductor interface device assembly 320 may be made of a non-conductive material as described above to isolate the conductive points interfacing with the capacitive touch screen to the conductive pads 330 and 334. In some embodiments, the non-conductive bottom portion 324 of the polymer conductor interface device assembly 320 may be expanded to provide a shield for a user's hand such as a finger or palm shield of any size to minimize inadvertent touching of the capacitive touch screen.

In an aspect of the present disclosure, the conductive pads 330, 332, 334, and 36 shown in FIGS. 3A and 3B will wear the high dielectric coating differently over time with usage. It was found that the variation of wear of the coatings will create variations in responsiveness among the conductive pads during use of the polymer conductor interface device assembly 320. Such variations may grow to be large and cause errors or a degraded user experience. Accordingly, a set of instructions for a peripheral interaction device degradation management system may be executed on the information handling system to adjust for and accommodate this variation in conductive pad touch signal response. This peripheral interaction device degradation management system is further described below.

Figure 4:
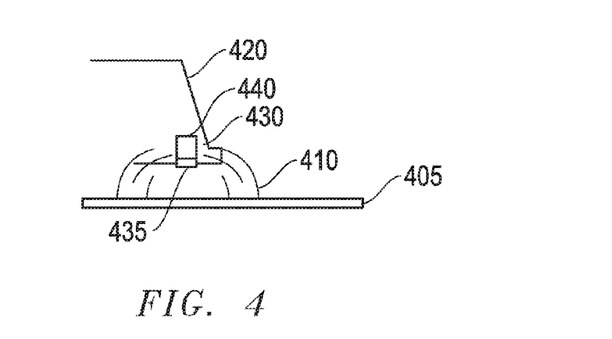
FIG. 4 is a graphical schematic diagram illustrating interaction of an information handling system and a polymer conductor interface device assembly according to an embodiment of the present disclosure.

FIG. 4 is another graphical diagram showing a cross-section of a polymer conductor interface device assembly 420 having a conduction pad 430. FIG. 4 further illustrates the capacitive touch screen 405 in proximity to the polymer conductor interface device assembly 420. The interaction of the polymer conductor interface device assembly 420 and the capacitive touch screen 405 may be shown with the field lines 410. The polymer conductor interface device assembly 420 has one or more conductive pads 430 made of a compressible material 440 and having a high dielectric coating or layer 435 in contact with the field 410 of the capacitive touch screen or directly in contact with the touch screen 405. The high dielectric coating or layer 435 is also in conductive contact, directly or indirectly though another material, with the conductive body of the polymer conductor interface device assembly 420. In this way, FIG. 4 illustrates the interaction of the polymer conductor interface device assembly 420 with the capacitive touch screen 405.

Figure 5:
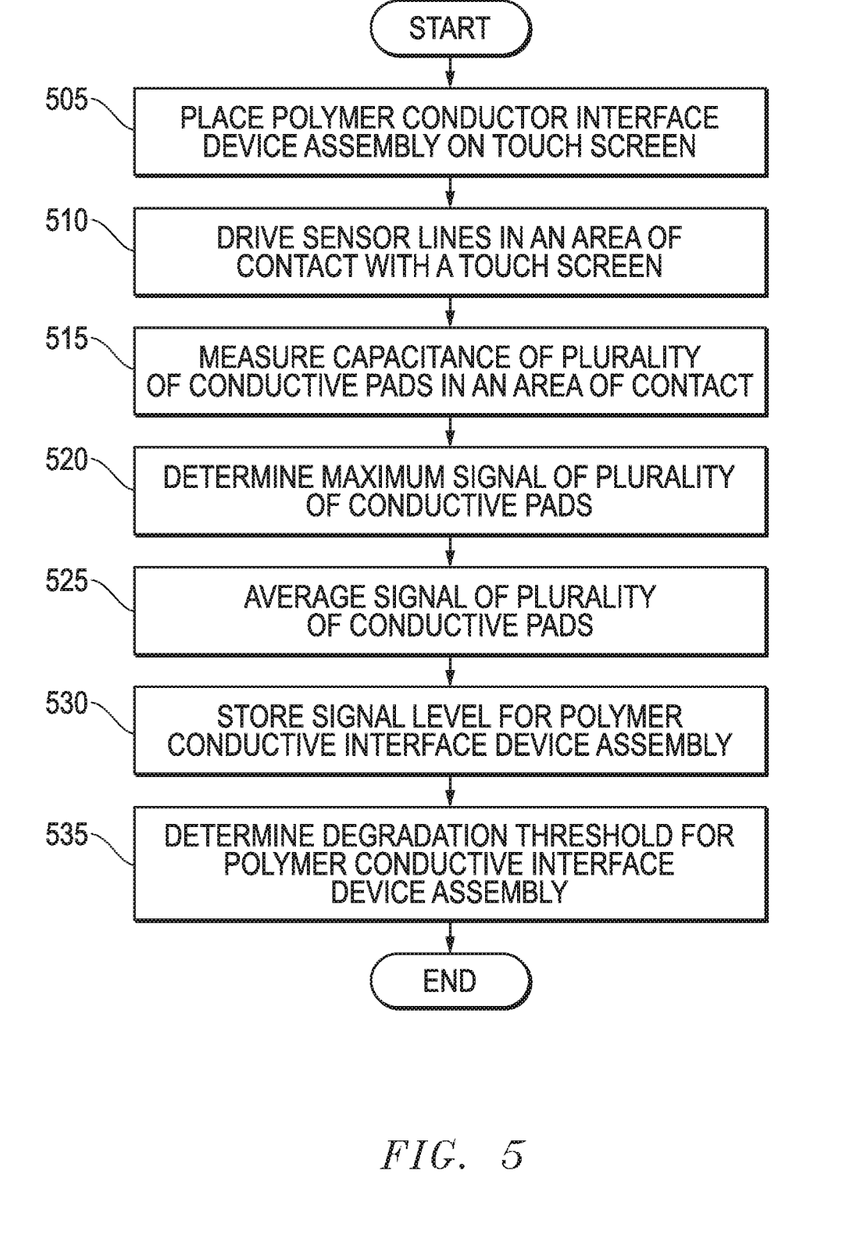
FIG. 5 is a flow diagram illustrating a method of calibrating interaction of a polymer conductor interface device assembly with an information handling system according to an embodiment of the present disclosure.

FIG. 5 is a flow diagram illustrating a process of calibrating a polymer conductor interface device assembly such as those described herein during interaction with a touch screen system. In an aspect, the method may involve execution of instructions of a peripheral interaction device degradation management system in software, firmware/BIOS, or hardware/hardcoded controller instructions to calibrate interaction of the polymer conductor interface device assembly.

At block 505, in an embodiment, a polymer conductor interface device assembly is placed in contact with a touch screen via the one or more conduction pads. The touch screen controller may detect and identify a polymer conductor interface device assembly interaction zone. In an example embodiment, the peripheral interaction device degradation management system may receive the detected location of one or more conductive pads on the touch screen and establish the polymer conductor interface device assembly interaction zone of a pre-determined size in relation to the detected conductive pads. The size of the polymer conductor interface device assembly interaction zone defined by the peripheral interaction device degradation management system may be in accordance with a size of the polymer conductor interface device assembly anticipated as being used. In an embodiment, the polymer conductor interface device assembly interaction zone may be a radius from the detected conduction pads or a defined block, triangle or other area shape of touch screen sensors around the polymer conductor interface device assembly location. It is understood, that a variety of sizes may be implemented. In a further aspect, interaction zone size settings may be adjustable or customizable by a user or automatically in accordance with the polymer conductor interface device assembly form factor being used and the detected conduction pads associated therewith.

The process of FIG. 5 proceeds to block 510 where the peripheral interaction device degradation management system will drive sensor lines in the area of contact with the touch screen. In an embodiment, the sensor lines in the polymer conductor interface device assembly interaction zone may be driven with voltage to take measurements of the conduction pad interaction. At 515, the peripheral interaction device degradation management system will measure the capacitance feedback for the one or more detected conduction pads in the polymer conductor interface device assembly interaction zone.

Proceeding to block 520, the peripheral interaction device degradation management system will determine the maximum signal from among the plurality of conductive pads for the polymer conductor interface device assembly. In an example embodiment, the maximum signal may be detected for each of the conductive pads for the polymer conductor interface device assembly within the interaction zone. The peripheral interaction device degradation management system will establish an average signal for the plurality of conductive pads at 525. The conductive pad average capacitive signal responses are impacted by proximity of a hand to the touch sensor and the level of degradation from each or the conductive pads. The touch controller and drivers will have jitter and false touch rejection capability that will filter out several aspects of a conductive pad capacitive touch response. Variations in conductive pad signal responses may be detected for individual conductive pads or for the group of conductive pads operating as several points on a touch sensor device. As the polymer conductor interface device assembly is tracked by each of its conductive pad points, the proximity of finger is filtered initially. A baseline capacitance after filtering is above 1 pF and can be tuned by changing the voltage of touch sensor, in this case, increasing the voltage. Other baseline capacitance levels may be employed as understood by those of skill. Further, the baseline capacitance response signal levels may also apply to individual conductive pads or a group of more than one conductive pads as contact points to the touch screen sensor depending on the embodiment. If decoupling occurs due to certain lift of one of the feet, based on hysteresis and dynamic movement an average may be calculated for example.

At 530, in an example embodiment an average capacitive signal for the plurality of conductive pads, after filtering for jitter and false touch signals, of the polymer conductor interface device assembly will be stored as a baseline signal level for this peripheral device. The interaction device degradation management system will have settings for determining a degradation threshold in the capacitive feedback signal for the conductive pads below which degradation of the signal is not acceptable. In an example embodiment, the degradation threshold may be a fixed degradation capacitance level response level below the signal average. In other example embodiments, the degradation threshold may be a signal that reaches a percentage below the average signal for the plurality of conductive pads. In other example embodiments, the degradation threshold may be a signal that reaches a percentage below the baseline average signal for the plurality of conductive pads. Any percentage below the baseline average signal is contemplated. In an example embodiment, degradation threshold may be at a level of 10% or 15% below the baseline average signal. For example, a reduction if the signal from any of the conductive pads of a polymer conductor interface device assembly falls below a threshold level, degradation management measures may be implemented as discussed further herein. In other aspects, if the average signal of the conductive pads falls below a threshold level, the degradation management measures may be implemented such as those discussed further herein.

In another aspect, a degradation threshold level may be established for each of the conductive pads of the polymer conductive interface assembly. A baseline signal level may be measured and assigned to each conductive pad. In an embodiment, these measurements may be taken while the polymer conductor interface device assembly is still new to calibrate the polymer conductor interface device assembly. A lowest baseline detected signal level for any of the one or more conductive pads may be determined to be a base signal level for the conductive pads of the polymer conductor interface device assembly in another embodiment. The degradation threshold may be a set signal level below that lowest detected conductive pad baseline signal level or may be a percentage below the lowest detected conductive pad signal level. If calibrated, the polymer conductor interface device assembly may have the degradation threshold level assigned to it during future operations by the interaction device degradation management system. At this point, the process may end.

It is understood that the method steps described above in FIG. 5 may be performed in any order and that some or all steps may not be performed in every embodiment. In other embodiments, it is understood that additional steps may be performed in any combination.

Figure 6:
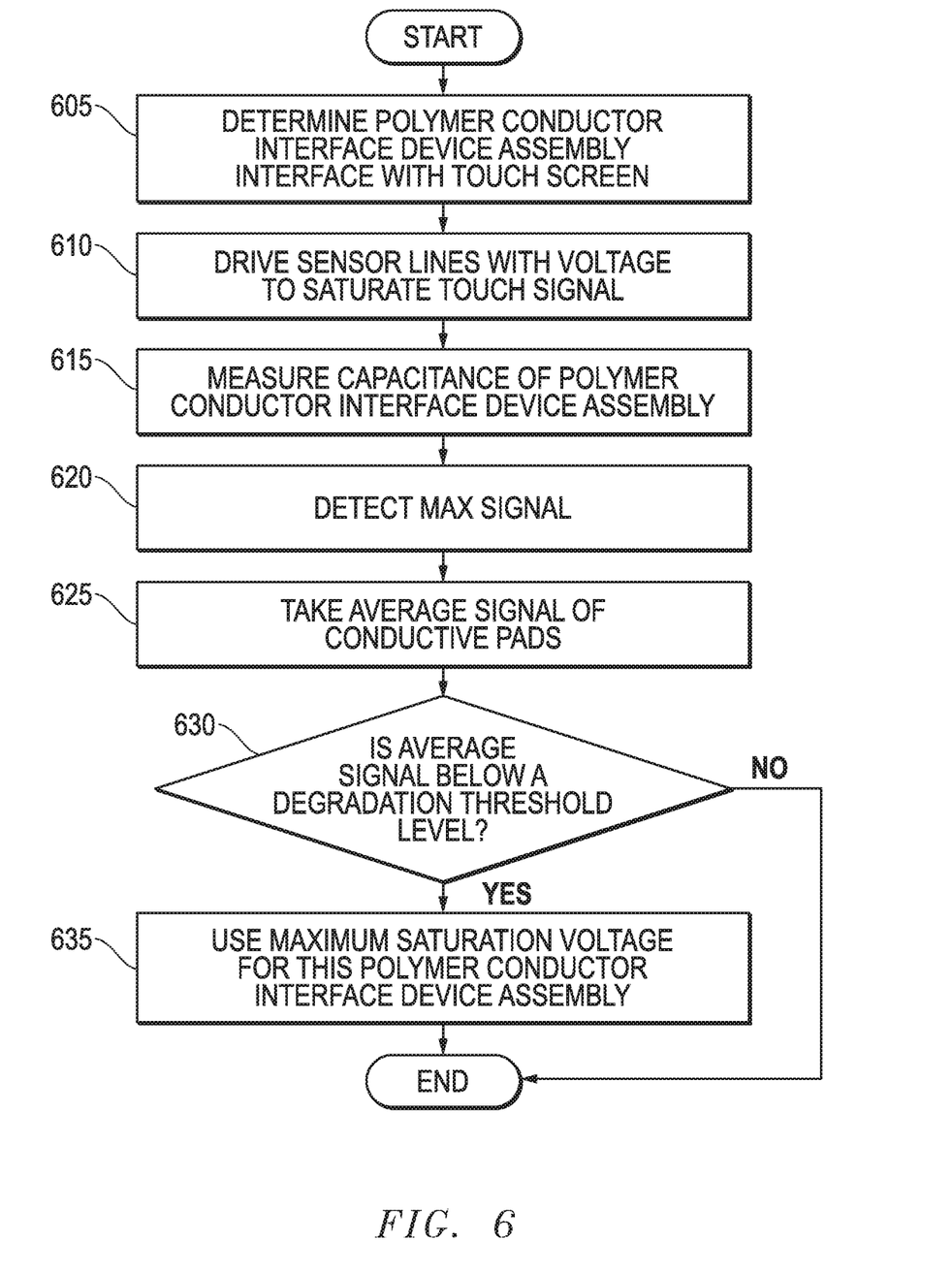
FIG. 6 is a flow diagram illustrating a method of operation of an information handling system interacting with a polymer conductor interface device assembly with according to an embodiment of the present disclosure.

FIG. 6 is a flow diagram illustrating a process of management of degradation of a polymer conductor interface device assembly during interaction with a touch screen system. In an aspect, the method may involve execution of instructions of a peripheral interaction device degradation management system in software, firmware/BIOS, or hardware/hardcoded controller instructions to monitor interaction of the polymer conductor interface device assembly.

At block 605, in an embodiment, a polymer conductor interface device assembly is placed in contact with a touch screen via the one or more conduction pads. As previously described, the touch screen controller may detect the polymer conductor interface device. In an example embodiment, the peripheral interaction device degradation management system may receive data that one or more conductive pads are in contact or otherwise interacting with the touch screen system.

Proceeding to block 610, the peripheral interaction device degradation management system will drive sensor lines of the touch screen. In an embodiment, the sensor lines may be driven with voltage to saturate the touch screen signals received from the conduction pads. At 615, the peripheral interaction device degradation management system will measure the capacitance feedback capacitance signal for the one or more detected conduction pads of the polymer conductor interface device assembly.

At block 620, the peripheral interaction device degradation management system will determine the maximum signal from the plurality of conductive pads for the polymer conductor interface device assembly. In an example embodiment, the maximum signal may be detected for each of the conductive pads for the polymer conductor interface device assembly within the interaction zone. The peripheral interaction device degradation management system will then establish an average signal for the plurality of conductive pads at 625.

Proceeding to 630, peripheral interaction device degradation management system determines whether the measured average capacitive signal for the plurality of conductive pads of the polymer conductor interface device assembly falls below the pre-calibrated degradation threshold level. The degradation threshold level may be pre-determined as described above. In an embodiment, the measured signal from the polymer conductor interface device assembly may be an average signal strength measured from one or more of the plurality of conductive pads and compared to a stored degradation threshold level. In other embodiments, a measured single conductive pad measurements may be taken and compared to the degradation threshold. In some aspects, if only a single conductive pad signal level falls below the degradation threshold level, the interaction device degradation management system may implement adjustments. This may occur in some embodiments because a plurality of conduction pad contact points to the touch screen may be instrumental in operating one or more of the virtual interface tools available with a touch screen GUI. For example in an embodiment, loss of a signal from a single conductive pad for a polymer conductor interface device assembly may alter interaction with a virtual interface tool on a smart desktop information handling system.

The interaction device degradation management system will make no adjustments at 635 and the process may end if the conductive pad signal for one or more conductive pads is not below a degradation threshold level. The interaction device degradation management system will adjust the touch screen driver settings upon proceeding to 635 if an average conductive pad signal falls below the degradation threshold level. In another embodiment, the interaction device degradation management system will adjust the touch screen driver settings at 635 if a single conductive pad signal falls below the degradation threshold level. At 635, the interaction device degradation management system will cause the touch screen driver to increase the driven voltage to capacitive touch sensors to yield a stronger capacitance signal from the one or more conductive pads.

In an example embodiment, the interaction device degradation management system may cause the touch screen controller to use a maximum saturation voltage for the detected polymer conductive interface assembly having one or more conductive pads responding below the degradation threshold level. In other embodiments, the interaction device degradation management system may cause the touch screen controller to use a sufficient saturation voltage for the detected polymer conductive interface assembly such that all of the one or more conductive pads respond above the degradation threshold level. In a further embodiment, the interaction device degradation management system may cause the touch screen controller to use another saturation voltage for the detected polymer conductive interface assembly to keep the responsive signal for all of the one or more conductive pads respond above the degradation threshold level by a predetermined amount such that resetting the driver voltage level need not occur with great frequency. It may be appreciated that any level of increase of driver voltage level to capacitive sensors of the touch screen may be used between a level sufficient to increase the response of all of the one or more conductive pads respond nearer to the degradation threshold level and up to a maximum saturation voltage level.

It is understood that the method steps described above in FIG. 6 may be performed in any order and that some or all steps may not be performed in every embodiment. In other embodiments, it is understood that additional steps may be performed in any combination.

Figure 7:
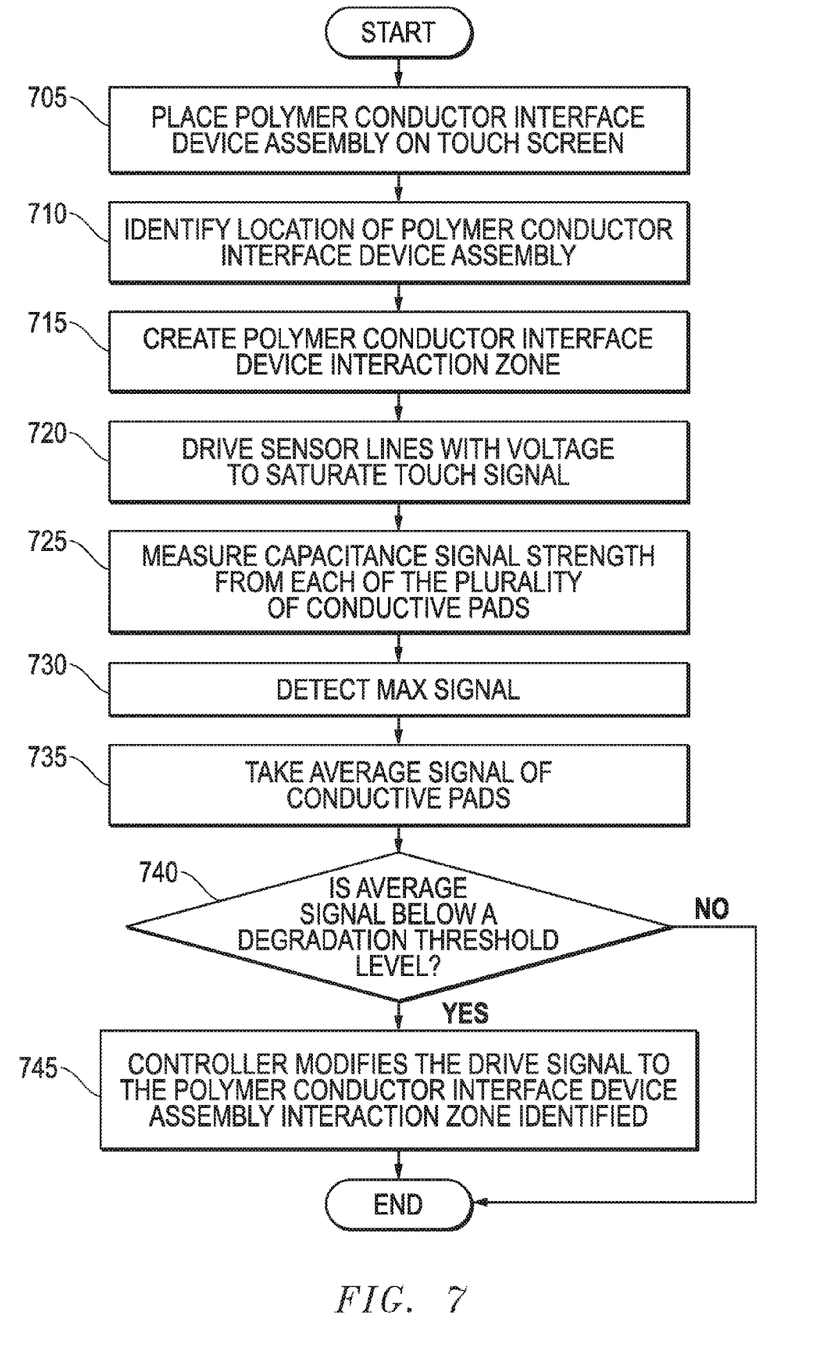
FIG. 7 is a flow diagram illustrating a method of operation of an information handling system interacting with a polymer conductor interface device assembly with according to another embodiment of the present disclosure.

FIG. 7 is a flow diagram illustrating another embodiment of the process of management of degradation of a polymer conductor interface device assembly during interaction with a touch screen system. In an aspect, the method may involve execution of instructions of a peripheral interaction device degradation management system in software, firmware/BIOS, or hardware/hardcoded controller instructions to monitor interaction of the polymer conductor interface device assembly.

At block 705, in an embodiment, a polymer conductor interface device assembly is placed in contact with a touch screen via the one or more conduction pads. At 710, the peripheral interaction device degradation management system may receive data identifying the location of the polymer conductor interface device assembly on the touch screen.

As previously described, the touch screen controller may detect and identify a polymer conductor interface device assembly interaction zone to the peripheral interaction device degradation management system at 715. In an example embodiment, the peripheral interaction device degradation management system may receive the detected location of one or more conductive pads on the touch screen and establish the polymer conductor interface device assembly interaction zone of a pre-determined size in relation to the detected conductive pads. The size of the polymer conductor interface device assembly interaction zone may be defined by the peripheral interaction device degradation management system. The definition may be in accordance with embodiments described herein and may be determined in relation to the size of the polymer conductor interface device assembly being used. It is understood, that a variety of sizes may be implemented. In a further aspect, interaction zone size settings may be adjustable or customizable automatically or by a user.

Proceeding to block 720, the peripheral interaction device degradation management system will drive sensor lines in the area of contact with the touch screen. In an embodiment, the sensor lines in the polymer conductor interface device assembly interaction zone may be driven with voltage to saturate the touch screen signals received from the conduction pads. At 725, the peripheral interaction device degradation management system will measure the capacitance feedback capacitance signal for the one or more detected conduction pads in the polymer conductor interface device assembly.

At block 730, the peripheral interaction device degradation management system will determine the maximum signal from the plurality of conductive pads for the polymer conductor interface device assembly. In an example embodiment, the maximum signal may be detected for each of the conductive pads for the polymer conductor interface device assembly within the interaction zone. The peripheral interaction device degradation management system will establish an average signal for the plurality of conductive pads at 735.

Proceeding to 740, peripheral interaction device degradation management system determines whether the measured average capacitive signal for the plurality of conductive pads of the polymer conductor interface device assembly falls below the previously calibrated degradation threshold level. The degradation threshold level may be determined as described above. In an embodiment, the measured signal from the polymer conductor interface device assembly may be an average signal strength measured from one or more of the plurality of conductive pads. In other embodiments, single conductive pad measurements may be taken and compared to the degradation threshold. In some aspects, of only a single conductive pad signal level falls below the degradation threshold level, the interaction device degradation management system may implement adjustments. This may occur in some embodiments because a plurality of conduction pad contact points to the touch screen may be instrumental in operating one or more of the virtual interface tools available with a touch screen GUI. For example in an embodiment, loss of a signal from a single conductive pad for a polymer conductor interface device assembly may alter interaction with a virtual interface tool on a smart desktop information handling system.

The interaction device degradation management system will make no adjustments at 740 and the process may end if the conductive pad signal for one or more conductive pads is not below a degradation threshold level. The interaction device degradation management system will proceed to 745 and adjust the touch screen controller driver settings at the polymer conductive interface device interaction zone if an average conductive pad signal falls below the degradation threshold level. In another embodiment, the interaction device degradation management system will adjust the touch screen driver settings for the polymer conductive interface device interaction zone at 745 if a single conductive pad signal falls below the degradation threshold level. At 745, the interaction device degradation management system will cause the touch screen driver to increase the driver voltage to the capacitive touch sensors in the polymer conductive interface assembly interaction zone to yield a stronger capacitance signal from the one or more conductive pads.

In an example embodiment, the interaction device degradation management system may cause the touch screen driver to use a maximum saturation voltage in the polymer conductive interface assembly interaction zone for the detected polymer conductive interface assembly having one or more conductive pads responding below the degradation threshold level. In other embodiments, the interaction device degradation management system may cause the touch screen driver to use a sufficient saturation voltage in the polymer conductive interface assembly interaction zone or contact area for the detected polymer conductive interface assembly such that all of the one or more conductive pads respond above the degradation threshold level. In a further embodiment, the interaction device degradation management system may cause the touch screen driver to use another saturation voltage in the polymer conductive interface assembly interaction zone or contact area for the detected polymer conductive interface assembly to keep the responsive signal for all of the one or more conductive pads respond above the degradation threshold level by a predetermined amount such that resetting the driver voltage level need not occur with great frequency. It may be appreciated that any level of increase of driver voltage level to capacitive sensors of the touch screen in a polymer conductive interface assembly interaction area may be used between that sufficient to increase the response of all of the one or more conductive pads respond above the degradation threshold level up to a maximum saturation voltage level.

It is understood that the method steps described above in FIG. 7 may be performed in any order and that some or all steps may not be performed in every embodiment. In other embodiments, it is understood that additional steps may be performed in any combination.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system for interacting with a peripheral interaction device having a plurality of conductive pads comprising: a display screen having a touch screen including a touch sensor device; the touch screen device detecting contact by a polymer conductor interface device assembly having a plurality of conductive pads; a processor executing instructions for a peripheral interaction device degradation management system; and the peripheral interaction device degradation management system determining whether there is degradation in the touch signal response of at least one conductive pad of the polymer conductor interface device assembly below a degradation threshold signal level, wherein the peripheral interaction device degradation management system increasing drive voltage to one or more sensor lines of the touch screen device when a signal is detected for at least one conductive pad that is below the degradation threshold signal level.

2. The information handling system of claim 1, further comprising:
the touch sensor device detecting a location of the contact of the peripheral interaction device with the touch screen; and
the processor determining a polymer conductor interface device assembly interaction area.

3. The information handling system of claim 1, wherein the peripheral interaction device degradation management system increases drive voltage level to the sensor lines to restore the touch signal response of the at least one conductive pad above tie degradation threshold signal level for the conductive pads.

4. The information handling system of claim 1, wherein the plurality of conductive pads of the polymer conductor interface device assembly are used by the information handling system as part of a graphical user interface (GUI) to operate a virtual knob.

5. The information handling system of claim 1, wherein contact with the touch screen device by the plurality of conductive pads of the polymer conductor interface device assembly is received as a compound input to operate a graphical user interface (GUI).

6. The information handling system of claim 1, wherein the degradation threshold signal level for the plurality of conductive pads is determined relative to an averaged maximum signal across each of the plurality of conductive pads before degradation.

7. The information handling system of claim 1, wherein the plurality of conductive pads of the polymer conductor interface device assembly operate rotational and translational GUI interaction of a virtual tool on the information handling system.

8. A computer-implemented method of a polymer conductor interface device assembly having a plurality of conductive pads interacting with an information handling system comprising: detecting a polymer conductor interface device assembly having a plurality of conductive pads touching a touch screen including a touch sensor device; executing instructions, via a processor, for a peripheral interaction device degradation management system determining whether there is degradation in the touch signal response of at least one conductive pad of the polymer conductor interface device assembly below a degradation threshold signal level; and adjusting, via the processor, the drive signal to sensor lines to restore the touch signal response of the at least one conductive pad to a level nearer to the degradation threshold signal level for the conductive pads when the touch signal response is below the degradation threshold signal level.

9. The process of claim 8, further comprising:
increasing drive voltage level to the sensor lines to restore the touch signal response of the at least one conductive pad above the degradation threshold signal level for the conductive pads.

10. The process of claim 8, further comprising:
increasing drive voltage level to the sensor lines to maximum saturation level to adjust the touch signal response.

11. The process of claim 8, further comprising:
detecting, via the touch sensor device, a location of the contact of the peripheral interaction device with the touch screen; and
determining a polymer conductor interface device assembly interaction area.

12. The process of claim 11, further comprising:
adjusting, via the processor, the drive signal to sensor lines in the polymer conductor interface device assembly interaction area to restore the touch signal response of the at least one conductive pad to a level nearer to the degradation threshold signal level for the conductive pads.

13. The process of claim 11, further comprising:
increasing drive voltage level to the sensor lines in the polymer conductor interface device assembly interaction area to maximum saturation level to adjust the touch signal response.

14. The process of claim 8, wherein the degradation threshold signal level for the plurality of conductive pads is determined relative to an averaged maximum signal across each of the plurality of conductive pads before degradation.

15. An information handling system for interacting with a peripheral interaction device having a plurality of conductive pads comprising: a display screen having a touch screen including a touch sensor device; the touch sensor device detecting a location of the contact of the peripheral interaction device with the touch screen; a processor determining a polymer conductor interface device assembly interaction area; a processor executing instructions for a peripheral interaction device degradation management system to drive sensor line voltages of the touch screen in the polymer conductor interface device assembly interaction area; the peripheral interaction device degradation management system determining whether there is degradation in the touch signal response of at least one conductive pad of the polymer conductor interface device assembly below a degradation threshold signal level, wherein the peripheral interaction device degradation management system increasing drive voltage to one or more sensor lines in the polymer conductor interface device assembly interaction area of the touch screen device when the touch signal response is detected for at least one conductive pad below the degradation threshold signal level.

16. The information handling system of claim 15, wherein the degradation threshold signal level was determined and stored before degradation of any conductive pad.

17. The information handling system of claim 15, further comprising:
the processor determining the degradation threshold signal level for the plurality of conductive pads 10% or 15% below an averaged maximum signal detected across each of the plurality of conductive pads at saturation voltage before degradation.

18. The information handling system of claim 15, wherein the peripheral interaction device degradation management system increases drive voltage level to the sensor lines to saturation voltage level upon detecting a conductive pad touch signal response signal below the degradation threshold signal level.

* * * * *